United States Patent [19]

Dubois et al.

[11] 4,221,513

[45] Sep. 9, 1980

[54] METHOD OF CONTINUOUSLY MACHINING SUPPORTS FOR ELECTROMAGNETIC WAVE GUIDES

[75] Inventors: Gilles Dubois; Jean-Pierre Hulin; Michel de Vecchis, all of Paris, France

[73] Assignee: Societe Lignes Telegraphiques et Telephoniques, Cedex, France

[21] Appl. No.: 797

[22] Filed: Jan. 3, 1979

[30] Foreign Application Priority Data

Jan. 4, 1978 [FR] France ............................... 78 00130
Jun. 13, 1978 [FR] France ............................... 78 17678

[51] Int. Cl.² .......................... B23C 3/13; B23C 3/32
[52] U.S. Cl. ................................. 409/131; 409/65; 409/66; 409/135; 409/137
[58] Field of Search ............... 409/64, 65, 66, 75, 409/131, 135, 136, 137; 29/33 S, 33 Q

[56] References Cited

U.S. PATENT DOCUMENTS

| | | | |
|---|---|---|---|
| 2,381,808 | 8/1945 | Davis et al. | 409/131 |
| 2,944,465 | 7/1960 | Jones | 409/137 |
| 3,167,260 | 1/1965 | Gibbons et al. | 409/137 X |
| 3,538,812 | 10/1970 | Morel | 409/137 X |
| 3,899,814 | 8/1975 | Kralowetz | 409/136 X |
| 4,103,588 | 8/1978 | Schmid | 409/136 |

*Primary Examiner*—William R. Briggs
*Attorney, Agent, or Firm*—Kemon & Estabrook

[57] ABSTRACT

Continuous machining of grooves in a cylindrical dielectric rod is achieved by guiding the rod into a heating machining head incorporating a rotating cutter made from a chemically etched stainless steel sheet and guiding the rod downstream of said head. A chip removing head made of a rotating unit comprising channels in which said chips are aspired by decompression effect of a gas is mechanically coupled with and upstream of the machining head.

5 Claims, 9 Drawing Figures

METHOD OF CONTINUOUSLY MACHINING SUPPORTS FOR ELECTROMAGNETIC WAVE GUIDES

PRIOR ART

The present invention concerns an improved continuous machining method by which a number of generally longitudinal grooves are simultaneously formed in a thin cylindrical rod. By "generally longitudinal" is meant either parallel to the axis of the cylinder or helically wound around the cylinder with a constant or reversed pitch. By "thin cylindrical rod" is meant a cylindrical member whose length may reach a number of kilometers and whose diameter is between a few millimeters and a few centimeters. The invention concerns more particularly the machining of complex structures having a rigid core on which a smooth sheathing of insulating material is extruded. Such structures are used for instance as the central element of a cable or of a cable element, comprising optical fibres as information transmission medium, such as described in the U.S. patent application Ser. No. 897,714 filed on the 19th Apr. 1978 now U.S. Pat. No. 4,156,624, for "The manufacture of optical fibers cables with simultaneous laying". There is described in the U.S. patent application Ser. No. 919,268 filed on the 26th June 1978, now U.S. Pat. No. 4,163,614 for "Extrusion tool", a tool by means of which such a structure with its grooves can be directly obtained by extrusion. The present invention relates to a method of machining a smooth structure obtained, for example, by extrusion.

BACKGROUND OF THE INVENTION

Machining after extrusion affords greater versatility of operation since it is thus possible to extrude cylindrical structures at high speed and to store them for the purpose of subsequent machining of the various types of cables or cable elements corresponding to the programme of production. The outside dimensions of the cables will be standardized, as well as the nature of the outer sheathing whereby the diameter of the optical fibre support will be fixed. However the number of optical fibres and the geometry of the grooves will vary from one type of cable to the other. The driving speed which can be used in machining the structure according to the present invention is higher than that which can be used for direct extrusion of the profiled structure. There is therefore an economical advantage in producing cables or cable elements according to the present method.

Machining of support for optical fibre cables according to the present invention favours the constitution of a continuous production line for the cables by coupling means for the manufacture of the grooved support according to the invention with fibre-positioning means, because the machining method according to the invention renders possible stopping of the line and restarting of the production line without creation of any discontinuity in the rod. When the grooved rod is obtained directly by extrusion stopping and restarting of the production line create irregularities on the support that make the cable lengths unusable and increase the overall cost of the cable length unit.

BRIEF SUMMARY OF THE INVENTION

Continuous machining of helical grooves in a cylindrical smooth rod requires the following steps:

supplying the rod from a storage reel guiding the rod along a preset direction removing chips resulting from machining by means of a rotating head bearing cutting blades passing alternately in front of ducts within said head into which the chips are forced by depression of a compressed gas passing the rod through a machining head rotating synchronously with said chip removing head comprising a thin sheet cutter with a chemically etched central cutting aperture guiding the rod along said preset direction driving the rod parallel to said direction storing the machined rod.

BRIEF DESCRIPTION OF THE DRAWINGS

The invention will be readily understood from the following description and by reference to the accompanying figures which are given by way of non-limiting example, and in which.

DETAILED DESCRIPTION OF THE INVENTION

Figure 1:
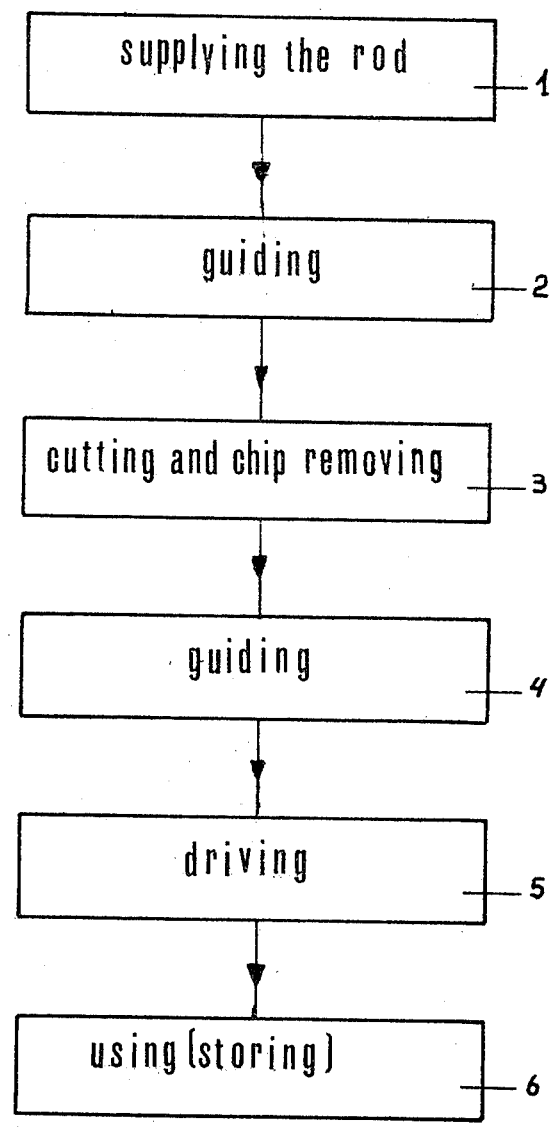
FIG. 1 is a diagram of the method according to the invention.

FIG. 1 is a block diagram of the various steps of the method. As shown at 1, the smooth rod is supplied from a supply reel and then axially guided (step 2) before being fed to the machining station. After machining (step 3), it is again axially guided (step 4) and then driven longitudinally (step 5) so as to be brought to the desired speed of travel for cutting. Machining is itself a two step process incorporating chip removing and groove cutting. The machined rod is then fed either directly to an optical fibre laying station or to a storage reel (step 6). The rotation of the groove cutting tool is set as a function of the geometry of the grooves, of the speed of travel and of the temperature of the tool, as will hereinafter be explained.

Figure 2:
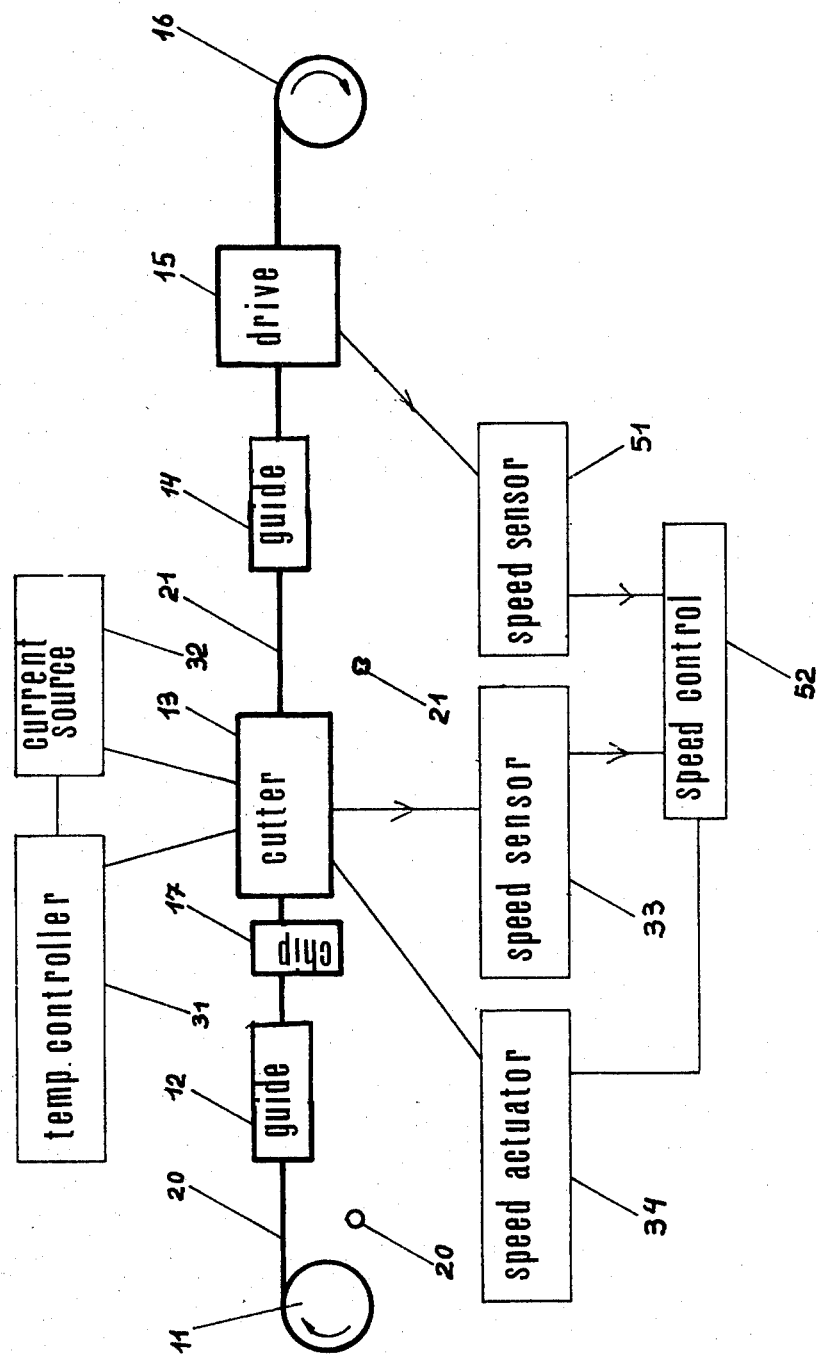
FIG. 2 is a diagram of a production station in which the said method is embodied.

FIG. 2 is a diagram of a machine for carrying out the method of FIG. 1. The supply reel 11, which is freely mounted on its horizontal axis, supplies the smooth rod 20, which is guided at 12 parallel to the direction of travel that is perpendicular to the axis of the reel 11. The travel direction is shown by the arrow. The rod is guided parallel to the axis of rotation of the cutting head over its whole course. It is important that the rod be maintained in this direction with precision on either side of the cutting head for the reasons hereinafter explained, and it is hence necessary to provide a second guide 14 on the downstream side of the cutting station 13.

Figures 3, 3A:
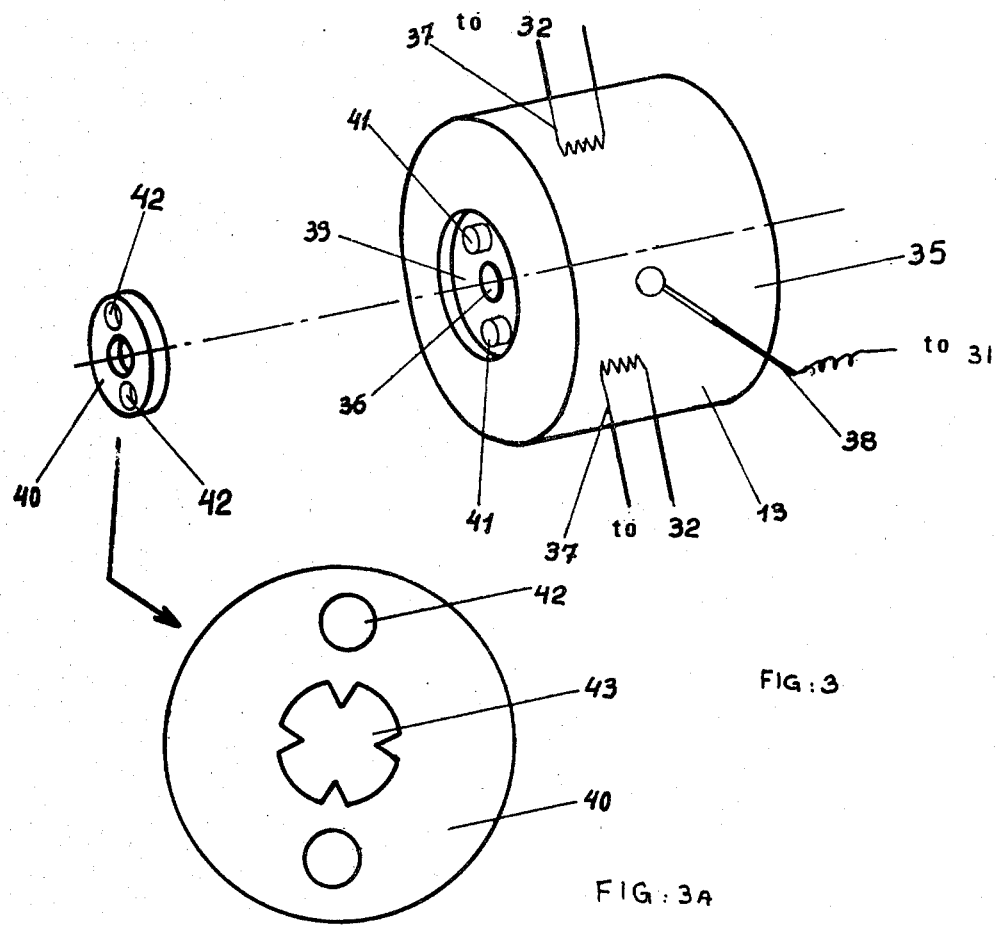
FIG. 3 is an exploded view of the cutting tool, of which a detail is shown in FIG. 3A.
Figure 5:
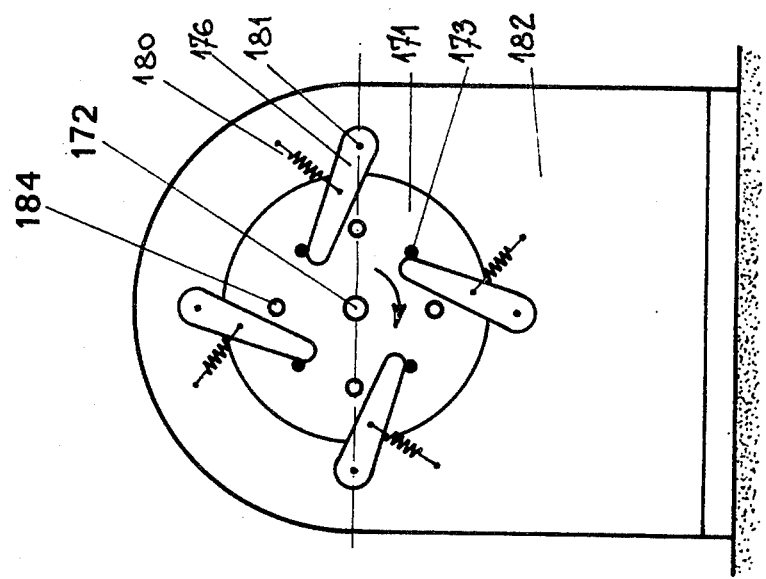
FIG. 5 is an elevational view of the cutting head.
Figure 4:
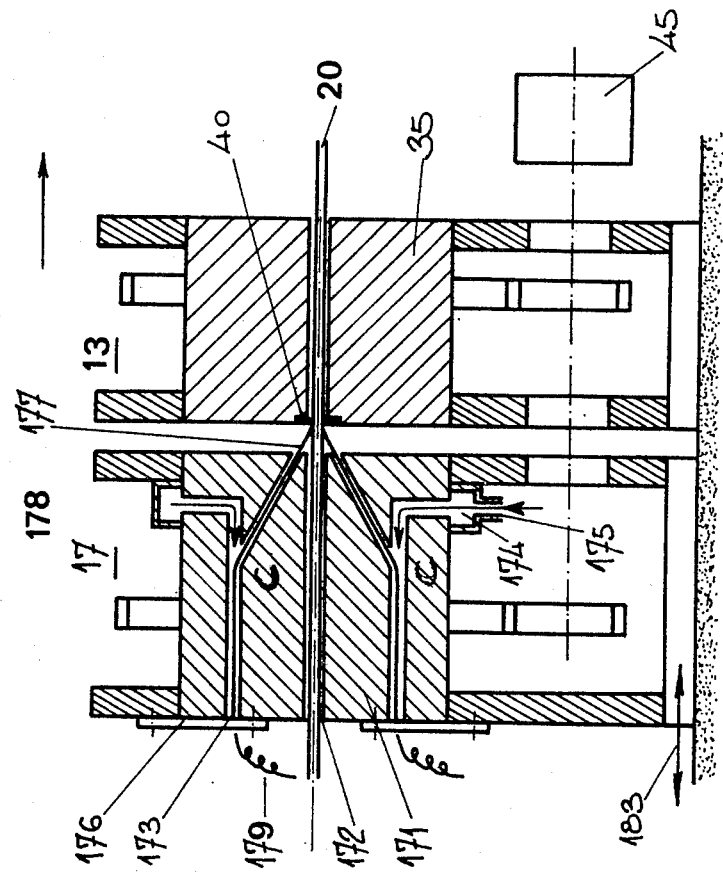
FIG. 4 is a sectional view of the station for the elimination of the chips, associated with the corresponding machining station, along a plane extending through the direction of travel.

The machining station 13 comprises essentially a heating machining head, one form of construction of which is illustrated in detail in FIG. 3 and a chip removing head shown in detail in FIGS. 4 and 5. The cutting head comprises a cutting tool 40 fixed on a heating housing 13 supplied by a heating current source 32, which feeds resistors disposed in the housing. The temperature of the tool is maintained at the desired value by a temperature controller 31 comprising a temperature probe and a controlled current source 32. The cutting head is rotated by a driving member (not shown), the speed of which is fixed by a speed actuator 34. The speed of rotation is controlled by the control circuit 52, which receives the data from the sensor 33 which detects the speed of rotation of the cutting head, and which is, for example of the photoelectric type, and from a second sensor 51 for the speed of travel, so as to maintain the pitch of the helix of the grooves at the desired value. Capstan 15 pulls the rod. It is driven by an actuator not shown. The speed of the rod is sensed by sensor 51. The machined rod is stored on reel 16. At 20 and 21 respectively are shown the profiles of the rod before and after it has passed through the machining head 13–17. The chips which are formed in the course of the cutting are removed at 17, upstream of the cutter. A preferred form of construction of the chip-removing unit is illustrated in detail in FIG. 4.

FIG. 3 is an exploded view of the cutting head 13, which consists of a heater built as a cylindrical metallic unit 35 formed with a central bore 36 for the rod and with beddings for heating elements such as 37, and a thermometric probe shown at 38. The upstream end face of the unit has a recess 39 intended to house the cutter 40, which consists of a metallic plate disposed in recess 39. Two studs 41 cooperate with apertures 42 machined in 40 to maintain the cutter in a fixed position in relation to the heating unit 35.

FIG. 3A is an enlarged front view of the cutter 40. As will be apparent, the latter has a central aperture 43 which defines the profile of the rod after machining. It will hereinafter be described how the dimensions of 43 are fixed to allow for optimal operation of the line.

In a preferred mode, the cutter is obtained by chemical etching of a stainless steel sheet of a few tenths of a millimeter thick. In the course of the operation, the cutting head formed of the heating unit 35 and the cutter 40 is activated in rotation about the axis of the bore 36. The smooth rod enters the aperture 43. The cutter is maintained at the desired temperature by 35 through the control of probe 38. The speed of rotation is fixed and adapted to the speed of travel in such manner as to obtain the desired pitch for the helices defined on the surface of the rod by the ridges bounding the aperture 43.

Figure 6:
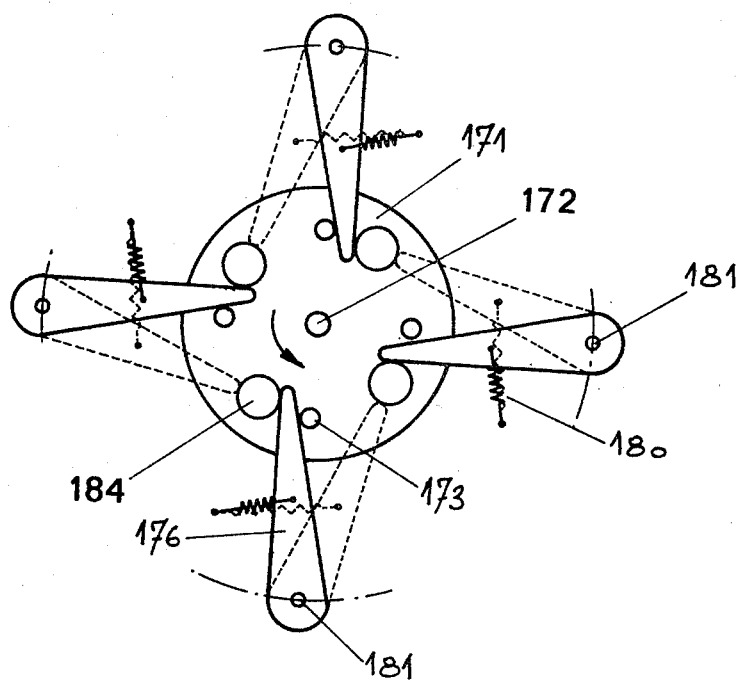
FIGS. 6 and 7 are diagrams illustrating the movement of the cutters.
Figure 7:
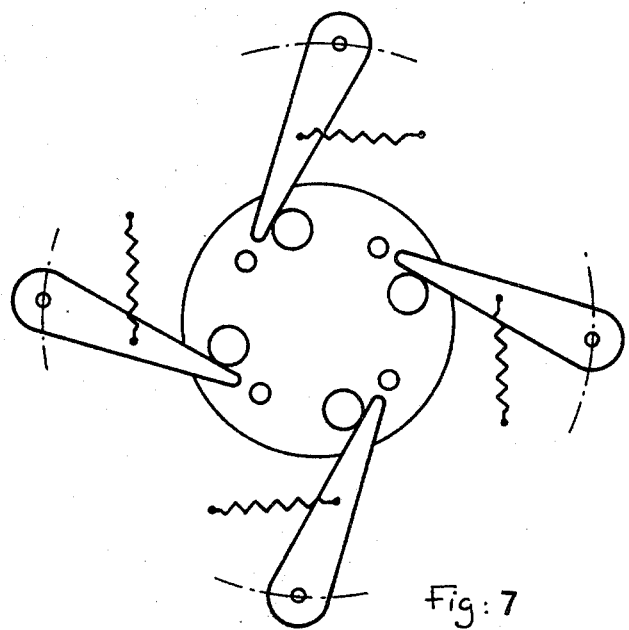

FIG. 4 shows the assembly consisting of the cutting head 13 and the chip-removal device 17 in section along a plane extending through the axis of the rod 20. The arrow represents the direction of travel of the rod 20. Upstream of head 13 is a second solid cylindrical metallic structure 171 formed with a central bore 172 intended for the passage of the rod 20, as well as with lateral channels such as 173 having a first portion parallel to the axis of travel of the rod and a second portion nearest to head 13, equally inclined on said axis and so oriented that they are situated on a cone the apex which is the center of the cutter 40. That portion of the said channels which is parallel to the axis of travel is outwardly prolonged beyond the beginning of the conical portion as ducts 178 which communicate with an annular chamber 174 common to all the ducts 178. Chamber 174 communicates by way of a nozzle 175 with a supply of compressed gas at superatmospheric pressure (not shown). The path of the compressed gas is indicated by the arrows. As is well known, the displacement of the gas through decompression creates a depression by Venturi effect in the neighbourhood of the points C of interconnection between each duct 178 and the corresponding channel 173. The whole structure 171 is rotated by the same motor 45, as the cutting head 13 and in synchronism therewith. The upstream face of 17 supports knives 176, which can be more clearly seen in FIG. 5, and which are movable past the end of the channels 173. There is shown at 179 a chip which has been cut by one of the knives 176. The upstream terminal face of 171, in addition, supports a set of fingers such as 184 distributed, like the opening ending the channels 173, over a circumference concentric with unit 171, and of which the radius is made such that the cutter 176 abuts the fingers 184 under the action of the force exerted by the springs 180, which pivot the knives about a pin 181 fast with the frame 182 of the machine. The arrow indicates the direction of rotation of the member 171 in the course of operation. The movement of the knives 176 will readily be understood by reference to the diagrammatic FIGS. 6 and 7. In FIG. 6, one of the extreme positions of the knives 176 is indicated in solid lines and a second position of these knives in chain lines. As is apparent from FIG. 6, the rotation of the member 171 tends to displace the knives to the right under the action of the pressure exerted by the fingers 184. The knives 176 turns about their pin 181, thereby tensioning the spring 180, until this rotation enables them to escape from the fingers 184 (position of the cutters indicated in chain lines in FIG. 6). Under the action of the return force exerted by the spring 180, the knife is then suddenly returned into its initial position until it abuts the next finger 184. In its travel, the knife encounters the end of a channel 173 occupied by one or more chips, which are cut under the action of the return force of the spring 180. The fingers 184 again displace the knives 176 to the right and the same movement is repeated.

Provision is made for reducing the number of channels 173 in relation to the number of chips and to use one channel for exerting suction on two or more chips when the machining points of the chips are sufficiently close.

The whole of the frame 182 is mounted on rails and can slide in a direction parallel to the axis of travel, as indicated by the arrow 183 (FIG. 4). At starting, the chips are manually pushed into the channels 173, the frame 182 being removed from the cutting head 13. The frame 182 is then returned into the position closest to the machining station and locked in position and the gas supply is connected to the nozzle 175. The chip sections are received in a receptacle on a conveyor belt (not shown), which brings them to a point of discharge, or sucked into a discharge channel.

Figure 8:
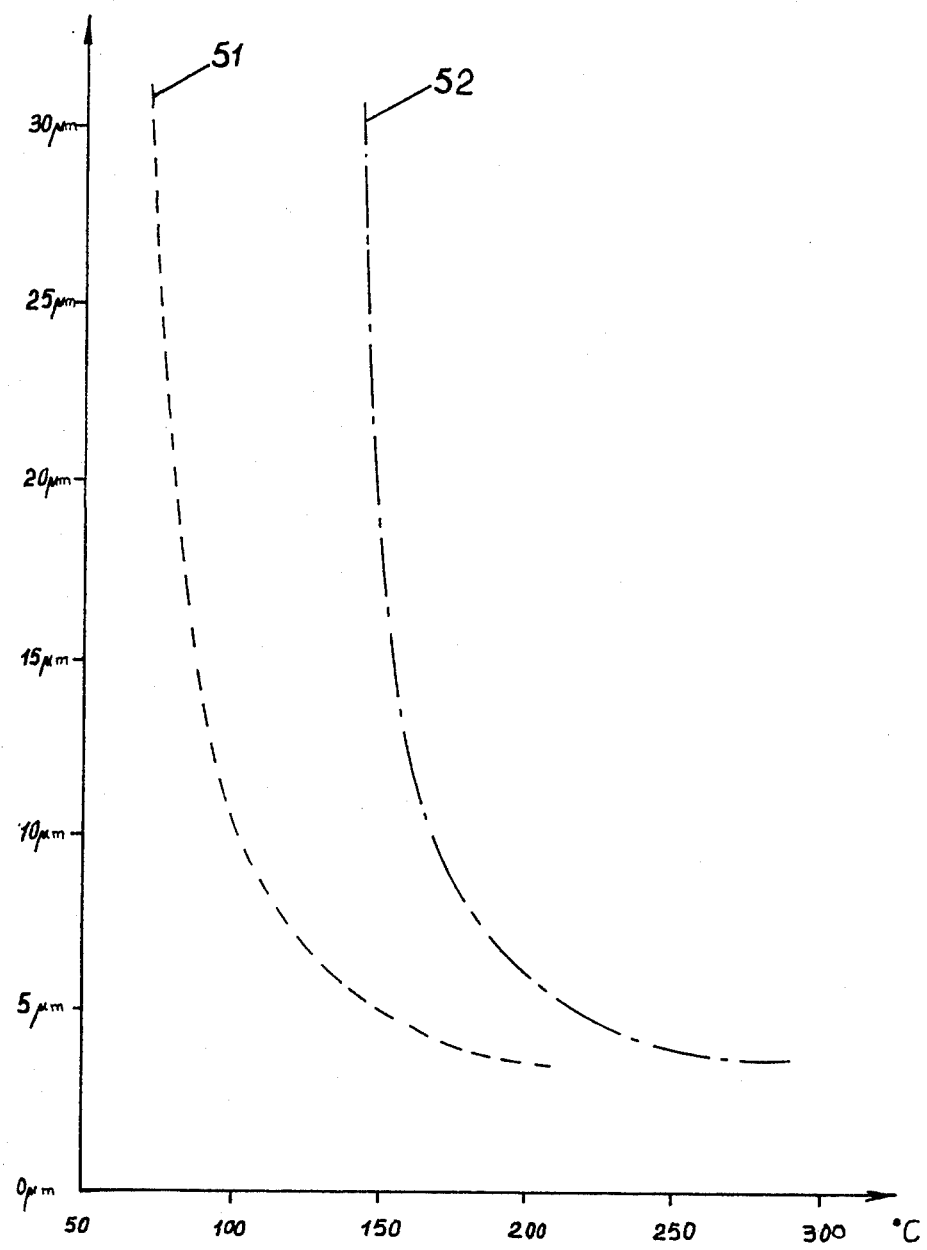
FIG. 8 illustrates the influence of the driving speed and the temperature upon the surface state of the grooves.

FIG. 8 illustrates the variation of the maximum amplitude of the irregularities on the surface of the groove as a function of the working temperature in the case of a relatively slow speed of travel (curve 51), that is to say, of the order of 5 meters per minute, and in the case of a higher speed (curve 52), that is to say, of the order of 15 meters per minute for rods made from polyethylene of medium density. The results show that, for this material, optimal surface state is obtained in the temperature range from 150° to 200° C. for speeds of less than 10 meters per minute and changes from 200° to 280° C. at speeds above this limit. In the case of polyvinyl chloride, at a speed of travel of 10 meters per minute, acceptable results are obtained when the temperature of the tool is between 200° and 300° C. In the case of polypropylene, the same speed of travel corresponds to heating of the tool to a temperature between 100° and 160° C.

For the same material and the same tool, the precision on the dimensions of the grooves depend upon the speed of travel.

For example, in the case of medium density polyethylene, in the speed range from 0 to 10 meters per minute, the variations of dimensions of the grooves are less than 2/100 mm. For higher speeds, the variation of the dimensions becomes greater and may reach values of the order of 1/10 mm for a speed above 20 meters per minute, which necessitates correction of the profile of the tool.

To sum up, the profile, the pitch, the nature of the material and the surface state of the grooves having been set, it is advantageous for the manufacturer to use the maximum speed of travel and so to fix the temperature and the profile of the tool as to meet the set surface state conditions. The speed of rotation of the machining head is set by the pitch of the grooves once the speed of travel has been fixed.

Should the compromise in setting the parameters appear difficult to establish, machining of the groove may be achieved in two steps: a first step providing a coarse machining with a poor surface state and the second step mainly directed to smoothing the surface. The two machining heads are mechanically coupled and spaced apart by a multiple of the pitch.

What we claim

1. Continuous machining of helical grooves in a cylindrical smooth rod comprises the following steps:
    supplying the rod from a storage reel,
    guiding the rod along a preset direction,
    removing chips resulting from machining by means of a rotating head bearing cutting blades passing alternately in front of ducts within said head into which the chips are forced by decompression of a compressed gas,
    passing the rod through a cutting head rotating synchronously with said chip removing head comprising a thin sheet cutter with a chemically etched central cutting aperture,
    guiding the rod along said preset direction,
    driving the rod parallel to said direction and
    storing the machined rod.

2. Continuous machining according to claim 1, wherein the rod is successively passed through two machining heads rotated synchronously and spaced apart at a distance which is an integral multiple of the pitch of the helical grooves so that the first effects the coarse machining and the second the finishing.

3. Continuous machining according to claim 1, wherein the cylindrical rod consists of medium density polyethylene, has a diameter of less than a few centimeters and travels at less than 10 meters per minute, and the temperature of the machining head is between 150° and 200° C.

4. Continuous machining a rod according to claim 1, wherein the said cutting blades of the chip removing head are rotationally driven by the said rotating head over a fraction of each revolution and then subjected to a return force which forces them back into their initial position.

5. A machine for machining helical grooves in a rod of dielectric material continuously driven along its axis comprising:
    a means providing a supply of smooth rod,
    a first guide for said rod,
    a chip removing head comprising a solid bloc with inner ducts directed along the surface of a cylinder terminated by a cone in which said chips are aspired by the decompression of a gas introduced through outwardly directed ducts corresponding with said inner ducts and a set of blades passing alternately in front of the outlet of said inner ducts and a central duct for the rod, said head being rotatable around the axis of the rod,
    a groove cutting head synchronously driven with said chip removing head comprising a heating body with a central duct for said rod around which is located a thin stainless steel plate in which a central aperture having cutting means has been made by chemical etching,
    a second guide for said rod,
    a drive for moving said rod past said chip removing and groove cutting heads and
    a storage for machined rod.

* * * * *